Figure 1:
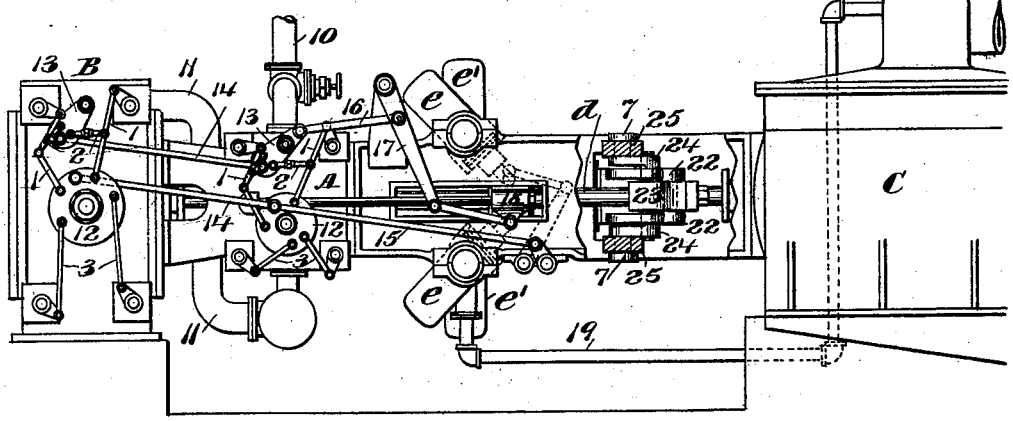

No. 861,801. PATENTED JULY 30, 1907.
W. C. BROWN.
COMPENSATING DIRECT ACTING ENGINE.
APPLICATION FILED APR. 22, 1903.

3 SHEETS—SHEET 1.

No. 861,801. PATENTED JULY 30, 1907.
W. C. BROWN.
COMPENSATING DIRECT ACTING ENGINE.
APPLICATION FILED APR. 22, 1903.
3 SHEETS—SHEET 2.
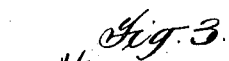
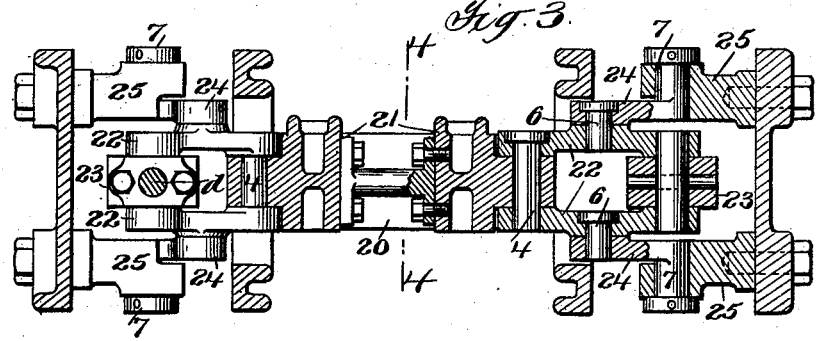
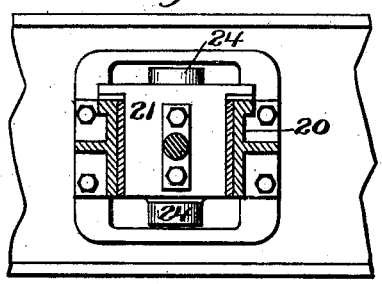
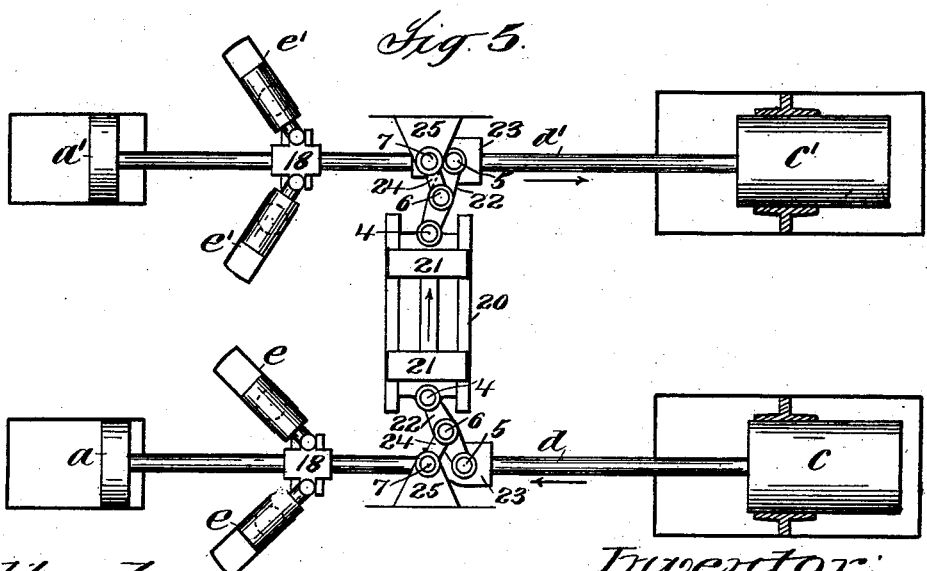
Attest:
W. H. Kennedy
J. A. Travis
Inventor:
William C. Brown
by Philip Sawyer Rice & Kennedy
Attys No. 861,801. PATENTED JULY 30, 1907.
W. C. BROWN.
COMPENSATING DIRECT ACTING ENGINE.
APPLICATION FILED APR. 22, 1903.
3 SHEETS—SHEET 3.
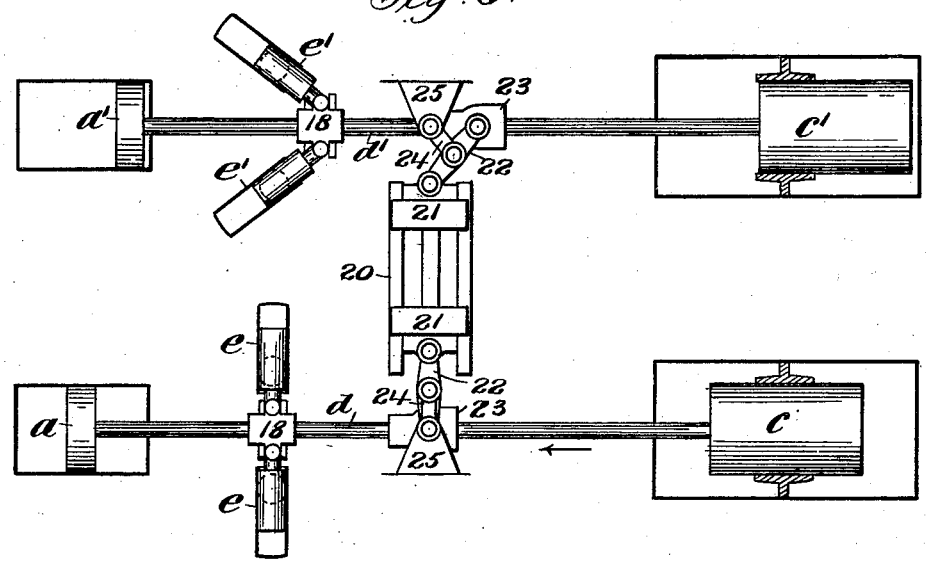
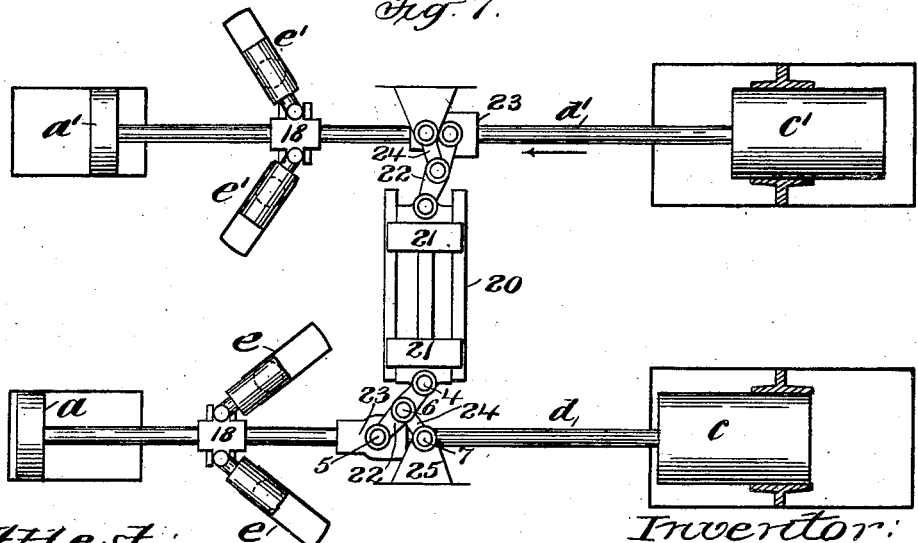
Attest:
W. S. Kennedy
J. H. Traver
Inventor:
William C. Brown
by Philipp Trupp & Kennedy
Attys

UNITED STATES PATENT OFFICE.

WILLIAM C. BROWN, OF NEW YORK, N. Y., ASSIGNOR TO HENRY R. WORTHINGTON, OF NEW YORK, N. Y., A CORPORATION OF NEW JERSEY.

COMPENSATING DIRECT-ACTING ENGINE.

No. 861,801.    Specification of Letters Patent.    Patented July 30, 1907.

Application filed April 22, 1903. Serial No. 153,726.

*To all whom it may concern:*

Be it known that I, WILLIAM C. BROWN, a citizen of the United States, residing at the borough of Richmond, city of New York, county of Richmond, and State of New York, have invented certain new and useful Improvements in Compensating Direct-Acting Engines, fully described and represented in the following specification and the accompanying drawings, forming a part of the same.

The present invention relates to an improved compensating direct acting pumping engine or similar compensating direct acting engine, in which means for storing up power during the first part of the stroke and utilizing it during the last part of the stroke are combined with positive connections between the piston rods by which each piston assists the other during the last part of the stroke, so as to secure a high economy and a regular and determinate stroke and timing under all conditions.

In compensating direct acting engines, in which compensating cylinders, springs, weights, or similar means are used for storing up power during the one part of the stroke and utilizing it during another part of the stroke, the load carried by the compensating mechanism has been a very large proportion of the total load, in order to secure the desired early cut off and high duty, and for this purpose it has been necessary to use heavy and expensive compensating mechanism. In the use of compensating cylinders, for instance, which is the usual form of such compensating mechanism, very large cylinders and pistons are necessary, unless a large and expensive accumulator construction be employed for the purpose of increasing the pressure on the compensating cylinders above the supply pressure, which is usually the force main in pumping engines, and even with such accumulator construction the compensating cylinders and pistons are necessarily quite large and heavy. Such compensating mechanism, moreover, while it aids in securing a full stroke does not assure this, but under varying conditions the stroke and timing of the opposite sides of the engine is liable to vary. Instead of using such compensating cylinders or similar means, by which power is stored up during the first part of the stroke and utilized during the last part of the stroke, it has been suggested to use a system of arms or levers connecting the piston rods of duplex or similar direct acting engines, so arranged that each piston at the beginning of its stroke before the steam is cut off aids the other piston on which the steam is then acting expansively, and in turn is similarly aided during the last part of its stroke by the other piston during the admission of steam to the latter, thus assuring a full stroke and uniform timing of the opposite sides of the engine.

The present invention consists in combining such pressure storing compensating mechanism with devices for thus connecting the piston rods so as to assist each piston by the other. I thus reduce the load upon each of these compensating means so that a comparatively light and cheap construction of compensating cylinders or similar pressure storing mechanism may be used, and the connections between the piston rods for aiding one by the other may be quite light as compared with constructions employing such devices without compensating cylinders or similar power storing means, while great efficiency and a very high economy are secured by the cocation of these two compensating means and a fixed and determinate length of stroke and timing under all conditions is assured.

For a full understanding of the invention a detailed description of a construction embodying the same in one of its preferred forms will now be given in connection with the accompanying drawings forming a part of this specification, and the features forming the invention will then be specifically pointed out in the claims.

Figure 2:
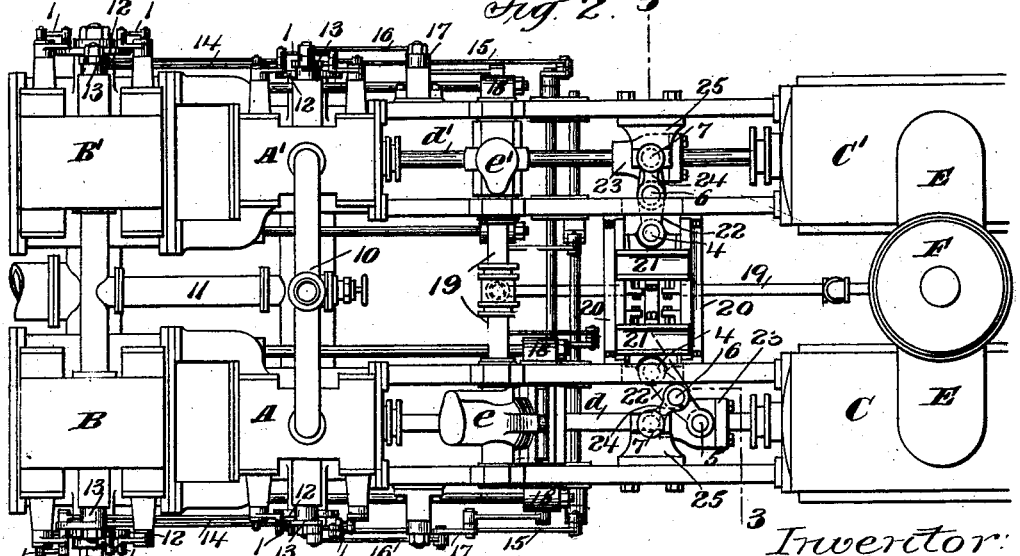

In the drawings:—Figure 1 is a side elevation of a duplex direct acting pumping engine of a well known class with the cradle broken away and parts sectioned to show the construction. Fig. 2 is a plan view of the same. Fig. 3 is a vertical cross section on an enlarged scale taken through the compensating lever devices on line 3 of Fig. 2. Fig. 4 is a section on the line 4 of Fig. 3. Figs. 5, 6 and 7 are diagrammatic views showing different positions of the parts.

Referring to the drawings, A, A' are the high pressure cylinders, B, B' the low pressure cylinders and C, C' the pump cylinders on opposite sides of the engine, the corresponding steam pistons $a$, $a'$ of the high pressure cylinders and plungers $c$, $c'$ of the pump cylinders, connected directly together by the piston and plunger rods $d$, $d'$, being shown in the diagrams Figs. 5 to 7.

The high pressure cylinders are supplied with steam through the induction pipe 10 and the low pressure cylinders by exhaust steam from the high pressure cylinders through pipe 11, as common in such constructions, and a valve movement is shown employing single admission and cut off valves and separate exhaust valves, the admission and exhaust valves being operated through links 1 from admission rocker 12 and by links 2 connected to links 1 from cut off rocker 13, the admission rocker 12 actuating the separate exhaust valves through links 3.

The low pressure admission and cut off rockers 12, 13 are connected by the links 14 to the corresponding rockers of the high pressure cylinders, and the high pressure admission rockers 12 are connected by links 15 to the levers of the usual cross over valve movement, and the high pressure cut off rockers 13 are connected by links 16 to the usual cut off levers 17, so that the admission rockers for each cylinder are actuated from the pistons on the opposite sides of the engine, and the cut off rockers on each cylinder are actuated by the pistons on their own side of the engine, as usual in this class of construction, the single admission and cut off valves thus being actuated for admission from the other side of the engine and for cut off by their own side. It will be understood, however, that any other suitable valve construction and valve movement for controlling the admission of steam to the cylinders may be used, either with combined or separate cut off valves.

Each of the rods $d$, $d'$ is provided with a pair of compensating cylinders and pistons lettered $e$, $e'$ corresponding to the opposite sides of the engine, the pistons of these cylinders being connected to the usual cross heads 18 and being supplied with fluid under pressure through pipe 19 shown as connected to the force main E of the pump below the usual air chamber F. While the force main supply is preferred, however, these compensating cylinders may be supplied from any other suitable source.

Referring now to the lever connections between the piston rods, there is mounted on the cradle, preferably between the compensating cylinders and the pump, as shown, a way 20 in which moves transversely to the piston rods a slide 21, and this slide is connected at opposite ends by links 22 to blocks 23 on the rods $e$, $e'$, the links 22 being pivoted to the slide and blocks by pivots 4, 5 respectively. Links 24 are pivoted to links 22 at 6 and are pivoted at 7 to fixed supports 25 on the cradle.

The operation of the construction will be readily understood from a brief description in connection with the diagrams Figs. 5 to 7. As shown in Fig. 5 the piston $a$ is on the first part of its stroke and the piston $a'$ on the last part of its stroke, the pistons moving in opposite directions as shown by the arrows, the steam being admitted behind the piston $a$ and having been cut off behind piston $a'$. The compensating cylinders $e$ are now acting in opposition to the piston $a$ and the latter is storing up pressure in the compensating cylinders through rod $d$, while the pressure previously stored up in compensating cylinders $e'$ is now being utilized to assist piston $a'$ through the rod $d'$. The piston $a$ through rod $d$ and its links 22 is also moving the slide 21 toward the rod $d'$ and thus breaking down the toggle formed by the two links 22, 24 on the $d'$ rod side of the engine, thus aiding in moving the rod $d'$ and plunger $c'$ to the right through the last part of the stroke of the piston $a'$. As shown in Fig. 6 the piston $a$ is at the middle of its stroke and the piston $a'$ has reached the end of its stroke, the full stroke of the piston $a'$ being assured by the links 22 as the link 22 on the $a$ piston side of the engine reaches the position of dead center shown in this figure, so that a full and determinate stroke of the piston $a'$ and the proper timing of the pistons $a$, $a'$ is thus assured. Steam is now admitted behind the piston $a'$ and cut off behind piston $a$, and during the last part of the stroke of piston $a$ it is assisted by the compensating cylinders $e$, and by the piston $a'$ on the opposite side of the engine during the first part of the stroke of the latter, through the rod $d'$, the links and slide 21 exactly as previously described in connection with the last part of the stroke of piston $a'$, as shown in Fig. 7.

While I have shown for purpose of illustration a compensating cylinder construction of a form well known in connection with pumping engines made by Henry R. Worthington, and connections between the piston rods such as described and claimed in United States Letters Patent No. 690,969, dated January 14, 1902, it will be understood that the invention may be embodied in constructions employing connecting devices between the piston rods of widely different forms from those shown and that, while swinging compensating cylinders are preferably used as the power storing mechanism, the invention broadly considered, is not limited to these, but may be embodied in other compensating mechanism such as fixed compensating cylinders, springs, weights or the like.

While I have shown no accumulator for increasing the compensating cylinder pressure and one advantage of my invention is that the compensating cylinder load may be reduced thereby to such an extent that an accumulator is unnecessary with ordinary heads even with comparatively small compensating cylinders, it will be understood that any suitable accumulator construction may be employed, if desired, either for the purpose of reducing further the size of the compensating cylinders, or to permit the compensating cylinder pressure to be taken from a lower pressure supply, or for other reasons.

What is claimed is:—

1. In a compensating direct acting engine, the combination with a plurality of pistons timed differently, of connections between the pistons for aiding each piston in the last part of its stroke and securing a full stroke and uniform timing of the pistons, and means independent of said connections whereby power is stored up during one part of the strokes of the pistons and utilized during another part of the stokes.

2. In a compensating direct acting duplex engine, the combination with the cylinders and pistons on opposite sides of the engine, of connections between the pistons for aiding each piston in the last part of its stroke by the other piston and securing a full stroke and uniform timing of the pistons, and compensating mechanism independent of said connections acting to store up power during one part of the stroke of each piston and utilize it to aid the piston during another part of its stroke.

3. In a compensating direct acting duplex engine, the combination with the cylinders and pistons on opposite sides of the engine, of connections between the pistons for aiding each piston in the last part of its stroke by the other piston and securing a full stroke and uniform timing of the pistons, and compensating cylinders and pistons acting in opposition to each piston during the first part of its stroke and in conjunction therewith during the last part of its stroke.

4. The combination with the cylinders and pistons on opposite sides of a duplex direct acting engine, of slide 21 guided in a fixed path transverse to the piston rods, compensating toggle levers connecting the slide with the piston rods, and compensating cylinders and pistons $e$, $e'$ connected to the piston rods independently of the slide and toggle levers.

In testimony whereof, I have hereunto set my hand, in the presence of two subscribing witnesses.

WILLIAM C. BROWN.

Witnesses:
W. H. KENNEDY,
J. A. GRAVES.